(12) United States Patent
Yu et al.

(10) Patent No.: US 11,314,319 B2
(45) Date of Patent: Apr. 26, 2022

(54) OPERATION METHODS OF COMMUNICATION NODE IN NETWORK

(71) Applicants: Hyundai Motor Company, Seoul (KR); Kia Motors Corporation, Seoul (KR)

(72) Inventors: Sang Woo Yu, Seoul (KR); Jin Hwa Yun, Seoul (KR); Kang Woon Seo, Seoul (KR); Jun Byung Chae, Seoul (KR); Dong Ok Kim, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 171 days.

(21) Appl. No.: 16/741,799

(22) Filed: Jan. 14, 2020

(65) Prior Publication Data

US 2020/0150744 A1    May 14, 2020

Related U.S. Application Data

(62) Division of application No. 15/258,379, filed on Sep. 7, 2016, now Pat. No. 10,585,469.

(30) Foreign Application Priority Data

Sep. 8, 2015 (KR) .............................. 2015-0127126

(51) Int. Cl.
| | |
|---|---|
| *G06F 1/3287* | (2019.01) |
| *G06F 1/3209* | (2019.01) |
| *G06F 1/26* | (2006.01) |
| *H04L 12/12* | (2006.01) |
| *H04L 12/10* | (2006.01) |

(52) U.S. Cl.
CPC .......... *G06F 1/3287* (2013.01); *G06F 1/3209* (2013.01); *G06F 1/26* (2013.01); *G06F 1/266* (2013.01); *H04L 12/10* (2013.01); *H04L 12/12* (2013.01); *Y02D 10/00* (2018.01); *Y02D 30/50* (2020.08)

(58) Field of Classification Search
CPC ........ G06F 1/3287; G06F 1/3209; G06F 1/26; G06F 1/266; Y02D 10/00; Y02D 30/50; Y02D 10/171; Y02D 50/42; Y02D 50/40; Y02D 50/20; H04L 12/10; H04L 12/12
USPC ......................................................... 713/323
See application file for complete search history.

(56) References Cited

U.S. PATENT DOCUMENTS

| | | | |
|---|---|---|---|
| 6,055,464 A | 4/2000 | Nagano | |
| 10,585,469 B2* | 3/2020 | Yu | G06F 1/3287 |
| 10,754,411 B2* | 8/2020 | Kim | H04L 69/323 |
| 10,969,850 B2* | 4/2021 | Kim | H04W 52/0235 |

(Continued)

*Primary Examiner* — Ji H Bae
(74) *Attorney, Agent, or Firm* — Mintz Levin Cohn Ferris Glovsky and Popeo, P.C.; Peter F. Corless (57) ABSTRACT

An operation method of a communication node in an Ethernet-based vehicle network, the communication node including a regulator, a physical (PHY) layer unit, and a processor, includes outputting, by the processor, a first signal to initiate a supply of power to the communication node; outputting, by the processor, a second signal to initiate a transition of the communication node from a normal mode to a sleep mode; and transitioning, by the PHY layer unit, the communication node from the normal mode to the sleep mode when the second signal is received at the PHY layer unit from the processor.

10 Claims, 7 Drawing Sheets

(56) References Cited

U.S. PATENT DOCUMENTS

| | | | |
|---|---|---|---|
| 2004/0268170 A1* | 12/2004 | Ayyavu | G06F 1/3268 |
| | | | 713/323 |
| 2005/0005178 A1* | 1/2005 | Bashford | G06F 1/3268 |
| | | | 713/300 |
| 2009/0199022 A1 | 8/2009 | Fukuda | |
| 2012/0051241 A1 | 3/2012 | Mori et al. | |
| 2012/0327942 A1 | 12/2012 | Terabe et al. | |
| 2013/0263191 A1 | 10/2013 | Kitagawa | |
| 2015/0019887 A1 | 1/2015 | Yu | |
| 2015/0146745 A1 | 5/2015 | Kim et al. | |
| 2015/0199154 A1 | 7/2015 | Hirano | |
| 2015/0208349 A1 | 7/2015 | Ramamurthy et al. | |
| 2015/0212562 A1 | 7/2015 | Guichard et al. | |
| 2016/0132455 A1 | 5/2016 | Ho et al. | |
| 2018/0352512 A1 | 12/2018 | Kim et al. | |
| 2020/0218333 A1* | 7/2020 | Yu | G06F 1/3209 |

\* cited by examiner

OPERATION METHODS OF COMMUNICATION NODE IN NETWORK

CROSS-REFERENCE TO RELATED APPLICATIONS

This application is a divisional application of U.S. application Ser. No. 15/258,379, filed Sep. 7, 2016, which claims the benefit of and priority to Korean Patent Application No. 10-2015-0127126 filed on Sep. 8, 2015 in the Korean Intellectual Property Office (KIPO), the entire contents of which are hereby incorporated by reference as if fully set forth herein.

BACKGROUND

1. Technical Field

The present disclosure relates generally communication nodes in a network, and more specifically, to a method for controlling power of a communication node in a network.

2. Related Art

Along with the rapid digitalization of vehicle parts, the number and variety of electronic devices installed within a vehicle have been increasing significantly. Electronic devices may currently be used throughout the vehicle, such as in a power train control system, a body control system, a chassis control system, a vehicle network, a multimedia system, and the like. For instance, the power train control system may include an engine control system, an automatic transmission control system, etc. The body control system may include a body electronic equipment control system, a convenience apparatus control system, a lamp control system, etc. The chassis control system may include a steering apparatus control system, a brake control system, a suspension control system, etc. The vehicle network may include a controller area network (CAN), a FlexRay-based network, a media oriented system transport (MOST)-based network, etc. The multimedia system may include a navigation apparatus system, a telematics system, an infotainment system, etc.

Such systems and electronic devices constituting each of the systems are connected via the vehicle network, which supports functions of the electronic devices. For instance, the CAN may support a transmission rate of up to 1 Mbps and may support automatic retransmission of colliding messages, error detection-based on a cycle redundancy interface (CRC), etc. The FlexRay-based network may support a transmission rate of up to 10 Mbps and may support simultaneous transmission of data through two channels, synchronous data transmission, etc. The MOST-based network is a communication network for high-quality multimedia, which may support a transmission rate of up to 150 Mbps.

Meanwhile, the telematics system, the infotainment system, as well as enhanced safety systems of a vehicle require higher transmission rates and system expandability. However, the CAN, FlexRay-based network, or the like may not sufficiently support such requirements. The MOST-based network may support a higher transmission rate than the CAN and the FlexRay-based network. However, costs increase to apply the MOST-based network to all vehicle networks. Due to these limitations, an Ethernet-based network may be considered a vehicle network. The Ethernet-based network may support bi-directional communication through one pair of windings and may support a transmission rate of up to 10 Gbps.

Electronic devices included in each system of the vehicle may include a physical (PHY) layer unit and a controller unit which controls the PHY layer unit. The PHY layer unit may operate in a sleep mode, a normal mode (e.g., active mode), etc. The controller unit may operate in a power off mode, the sleep mode, the normal mode, etc. The power off mode may indicate a state in which power is not supplied to a corresponding entity. The sleep mode may indicate a state in which minimum power for basic operations is supplied to a corresponding entity. The normal mode may indicate a state in which power is normally supplied to a corresponding entity. As such, in the Ethernet-based vehicle network, methods for controlling these operation modes are necessary.

SUMMARY

Accordingly, embodiments of the present disclosure are provided to substantially obviate one or more problems due to limitations and disadvantages of the related art. The embodiments of the present disclosure provide methods for controlling operation modes of a communication node in a vehicle network.

In accordance with embodiments of the present disclosure, an operation method of a communication node in an Ethernet-based vehicle network, the communication node including a regulator, a physical (PHY) layer unit, and a processor, includes outputting, by the processor, a first signal instructing a supply of power; outputting, by the processor, a second signal instructing a transition from a normal mode to a sleep mode; and transitioning, by the PHY layer unit, from the normal mode to the sleep mode when the second signal is received at the PHY layer unit from the processor.

The method may further include outputting, by the PHY layer unit, a third signal instructing a power off.

The method may further include supplying, by the regulator, power to the processor according to a result of an OR calculation of the first signal and the third signal.

The method may further include transitioning, by the processor, from the normal mode to the sleep mode.

The normal mode may indicate a wakeup state, and the sleep mode may indicate a power saving state.

Furthermore, in accordance with embodiments of the present disclosure, an operation method of a communication node in an Ethernet-based vehicle network includes: transitioning, by the processor, from a sleep mode to a normal mode in response to a local wakeup signal; outputting, by the processor, a first signal instructing a transition from the sleep mode to the normal mode; and transitioning, by the PHY layer unit, from the sleep mode to the normal mode when the first signal is received at the PHY layer unit from the processor.

The method may further include outputting, by the processor, a second signal instructing a supply of power.

The method may further include outputting, by the PHY layer unit, a third signal instructing a supply of power.

The method may further include supplying, by the regulator, power to the processor according to a result of an OR calculation of the third signal and a second signal.

The normal mode may indicate a wakeup state, and the sleep mode may indicate a power saving state.

Furthermore, in accordance with embodiments of the present disclosure, an operation method of a communication node in an Ethernet-based vehicle network includes: outputting, by the PHY layer unit, an interrupt signal according to a remote wakeup signal; transitioning, by the processor, from a sleep mode to a normal mode when the interrupt signal is received at the processor from the PHY layer unit; outputting, by the processor, a first signal instructing a transition from the sleep mode to the normal mode; and transitioning, by the PHY layer unit, from the sleep mode to the normal mode when the first signal is received at the PHY layer unit from the processor.

The method may further include outputting, by the processor, a second signal instructing a supply of power.

The method may further include outputting, by the PHY layer unit, a third signal instructing a supply of power.

The method may further include supplying, by the regulator, power to the processor according to a result of an OR calculation of the third signal and a second signal.

The normal mode may indicate a wakeup state, and the sleep mode may indicate a power saving state.

Furthermore, in accordance with embodiments of the present disclosure, an operation method of a communication node in an Ethernet-based vehicle network includes: outputting, by the processor, a first signal instructing a power off; outputting, by the processor, a second signal instructing a transition from a normal mode to a sleep mode; transitioning, by the PHY layer unit, from the normal mode to the sleep mode when the second signal is received at the PHY layer unit from the processor; outputting, by the PHY layer unit, a third signal instructing a power off; stopping, by the regulator, a supply of power to the processor according to a result of an OR calculation the first signal and the third signal; and transitioning, by the processor, from the normal mode to a power off mode when the power is not supplied.

The normal mode may indicate a wakeup state, the sleep mode may indicate a power saving state, and the power off mode may indicate a state in which power is not supplied.

Furthermore, in accordance with embodiments of the present disclosure, an operation method of a communication node in an Ethernet-based vehicle network includes: outputting, by the processor, a first signal instructing a transition from a normal mode to a sleep mode; transitioning, by the PHY layer unit, from normal mode to the sleep mode when the first signal is received at the PHY layer unit from the processor; outputting, by the PHY layer unit, a second signal instructing a power off; outputting, by the processor, a third signal instructing the power off; stopping, by the regulator, a supply of power to the processor according to a result of an OR calculation the second signal and the third signal; and transitioning, by the processor, from the normal mode to a power off mode when the power is not supplied.

Furthermore, in accordance with embodiments of the present disclosure, an operation method of a communication node in an Ethernet-based vehicle network includes: outputting, by the PHY layer unit, a first signal instructing a supply of power according to a remote wakeup signal; outputting, by the processor, a second signal instructing a power off; supplying, by the regulator, power to the processor according to a result of an OR calculation the first signal and the second signal; transitioning, by the processor, a power off mode to a normal mode according to the supplied power; outputting, by the processor, a third signal instructing a transition from a sleep mode to the normal mode; and transitioning, by the PHY layer unit, from the sleep mode to the normal mode when the third signal is received at the PHY later unit from the processor.

The normal mode may indicate a wakeup state, the sleep mode may indicate a power saving state, and the power off mode may indicate a state in which the power is not supplied.

According to the embodiments of the present disclosure, the operation mode of the PHY layer unit and the controller unit which controls the PHY layer unit, included in the communication node, can be efficiently changed. For example, the operation mode of the controller unit can be transitioned from the normal mode to the sleep mode or the power off mode, and the operation mode of the PHY layer unit can be transitioned from the normal mode to the sleep mode based on control of the controller unit.

Also, when the local wakeup signal is generated, the operation mode of the controller unit can be transitioned from the sleep mode to the normal mode, and the operation mode of the PHY layer unit can be transitioned from the sleep mode to the normal mode based on control of the controller unit. When the remote wakeup signal is generated, the operation mode of the controller unit can be transitioned from the power off mode or the sleep mode to the normal mode, and the operation mode of the PHY layer unit can be transitioned from the sleep mode to the normal mode based on control of the controller unit.

As described above, the operation mode of the PHY layer unit and the controller unit included in the communication node can be efficiently changed. Therefore, a performance of the vehicle network can be enhanced.

BRIEF DESCRIPTION OF DRAWINGS

Embodiments of the present disclosure will become more apparent by describing in detail embodiments of the present disclosure with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although embodiments are described herein as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several embodiments, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example, within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, embodiments of the present disclosure will be described in detail with reference to the accompanying drawings. In describing the disclosure, to facilitate the entire understanding of the disclosure, like numbers refer to like elements throughout the description of the figures and the repetitive description thereof will be omitted.

Figure 1:
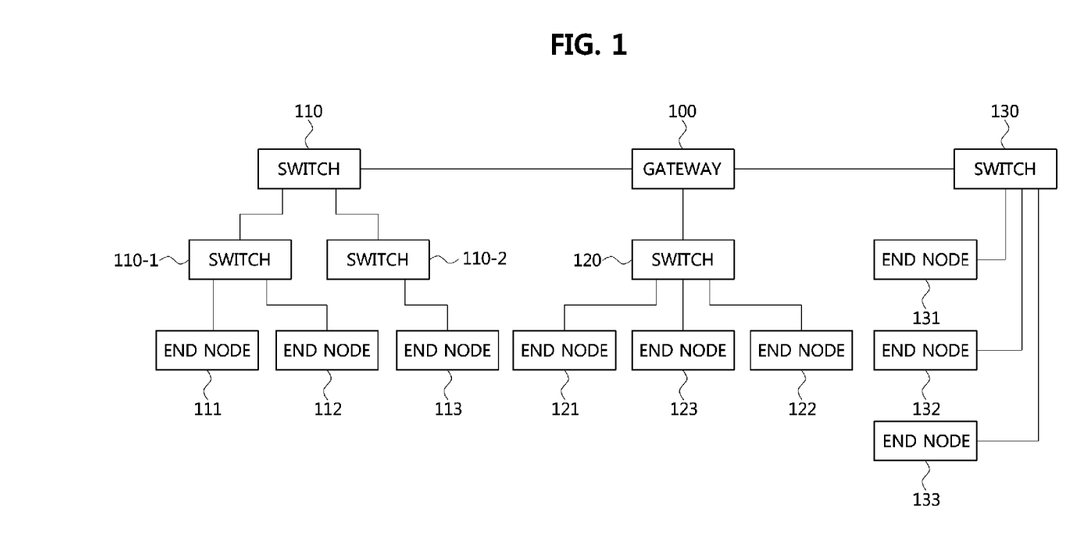
FIG. 1 is a diagram showing a vehicle network topology according to embodiments of the present disclosure.

FIG. 1 is a diagram showing a vehicle network topology according to embodiments of the present disclosure.

As shown in FIG. 1, a communication node may include a gateway, a switch (or bridge), or an end node. The gateway 100 may be connected with at least one switch 110, 110-1, 110-2, 120, and 130 and may be configured to connect different networks. For example, the gateway 100 may connect a switch that supports a controller area network (CAN) (e.g., FlexRay, media oriented system transport (MOST), or local interconnect network (LIN)) protocol and a switch that supports an Ethernet protocol. Each of the switches 110, 110-1, 110-2, 120, and 130 may be connected with at least one end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and operate at least one of end nodes connected to the switch.

The end nodes 111, 112, 113, 121, 122, 123, 131, 132, and 133 may include an electronic control unit (ECU) configured to operate various types of devices mounted within a vehicle. For example, the end nodes 111, 112, 113, 121, 122, 123, 131, 132, and 133 may include an ECU configured to operate an infotainment device (e.g., a display device, a navigation device, and an around view monitoring device).

Communication nodes (e.g., a gateway, a switch, an end node, or the like) included in a vehicle network may be connected in a star topology, bus topology, ring topology, tree topology, mesh topology, etc. In addition, the communication nodes of the vehicle network may support a CAN protocol, FlexRay protocol, MOST protocol, LIN protocol, or Ethernet protocol. Embodiments of the present disclosure may be applied to the above-described network topologies. The network topology to which embodiments of the present disclosure may be applied is not limited thereto and may be configured in various ways.

Figure 2:
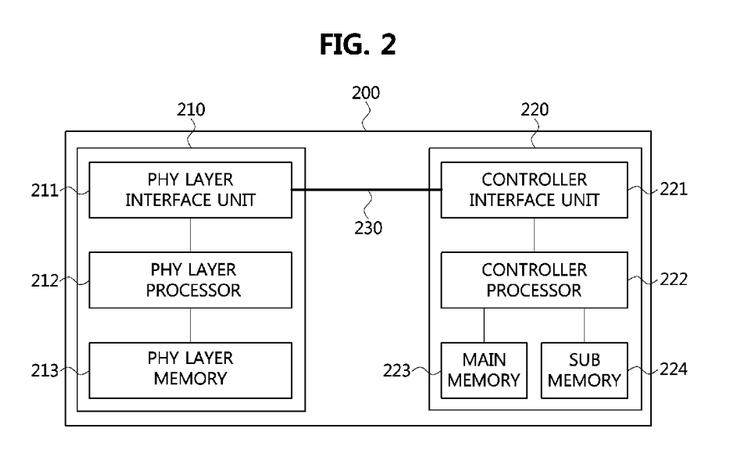
FIG. 2 is a diagram showing a communication node constituting a vehicle network according to embodiments of the present disclosure.

FIG. 2 is a diagram showing a communication node constituting a vehicle network according to embodiments of the present disclosure. Notably, the various methods discussed herein below may be executed by a controller having a processor and a memory.

As shown in FIG. 2, a communication node 200 of a network may include a PHY layer unit 210 and a controller unit 220. In addition, the communication node 200 may further include a regulator (not shown) for supplying power. In particular, the controller unit 220 may be implemented to include a medium access control (MAC) layer. A PHY layer unit 210 may be configured to receive or transmit signals from or to another communication node. The controller unit 220 may be configured to control the PHY layer unit 210 and perform various functions (e.g., an infotainment function, etc.). The PHY layer unit 210 and the controller unit 220 may be implemented as one system on chip (SoC), alternatively may be implemented as separate chips.

Further, the PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer unit 210 may include a PHY layer interface unit 211, a PHY layer processor 212, and a PHY layer memory 213. The configuration of the PHY layer unit 210 is not limited thereto, and the PHY layer unit 210 may be configured in various ways. The PHY layer interface unit 211 may be configured to transmit a signal received from the controller unit 220 to the PHY layer processor 212 and transmit a signal received from the PHY layer processor 212 to the controller unit 220. The PHY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to operate the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface unit 221, a controller processor 222, a main memory 223, and a sub memory 224. The configuration of the controller unit 220 is not limited thereto, and the controller unit 220 may be configured in various ways. The controller interface unit 221 may be configured to receive a signal from the PHY layer unit 210 (e.g., the PHY layer interface unit 211) or an upper layer (not shown), transmit the received signal to the controller processor 222, and transmit the signal received from the controller processor 222 to the PHY layer unit 210 or upper layer. The controller processor 222 may further include an independent memory control logic or an integrated memory control logic for operating the controller interface unit 221, the main memory 223, and the sub memory 224. The memory control logic may be implemented to be included in the main memory 223 and the sub memory 224 or may be implemented to be included in the controller processor 222.

Furthermore, each of the main memory 223 and the sub memory 224 may be configured to store a signal processed by the controller processor 222 and may be configured to output the stored signal based on a request from the controller processor 222. The main memory 223 may be a volatile memory (e.g., a random access memory (RAM)) configured to temporarily store data required for the operation of the controller processor 222. The sub memory 224 may be a non-volatile memory in which an operating system code (e.g., a kernel and a device driver) and an application program code for performing a function of the controller unit 220 may be stored. A flash memory having a high processing speed or a hard disc drive (HDD) or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although a method (e.g., signal transmission or reception) performed by a first communication node will be described below, a second communication node that corresponds thereto may perform a method (e.g., signal reception or transmission) corresponding to the method performed by the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Meanwhile, the PHY layer unit 210 (e.g., PHY layer processor 212) may operate in a sleep mode, a normal mode (e.g., active mode), etc. Based on control of the controller processor 222 (e.g., controller unit 220), an operation mode of the PHY layer unit 210 may be transitioned from the sleep mode to the normal mode or from the normal mode to the sleep mode. The controller processor 222 (e.g., controller unit 220) may operate in a power off mode, the sleep mode, the normal mode, etc. The operation mode of the controller processor 222 (e.g., controller unit 220) may be transitioned from the power off mode to the sleep mode or the normal mode, from the sleep mode to the power off mode or the normal mode, or from the normal mode to the power off mode or the sleep mode.

The power off mode may indicate a state in which power is not supplied to a corresponding entity (e.g., controller processor 222, etc.). The sleep mode may indicate a state (e.g., power saving state) in which minimum power for basic operations is supplied to a corresponding entity (e.g., PHY layer unit 210, controller processor 222, etc.). The normal mode may indicate a state (e.g., wakeup state) in which power is normally supplied to a corresponding entity (e.g., PHY layer unit 210, controller processor 222, etc.).

Figure 3:
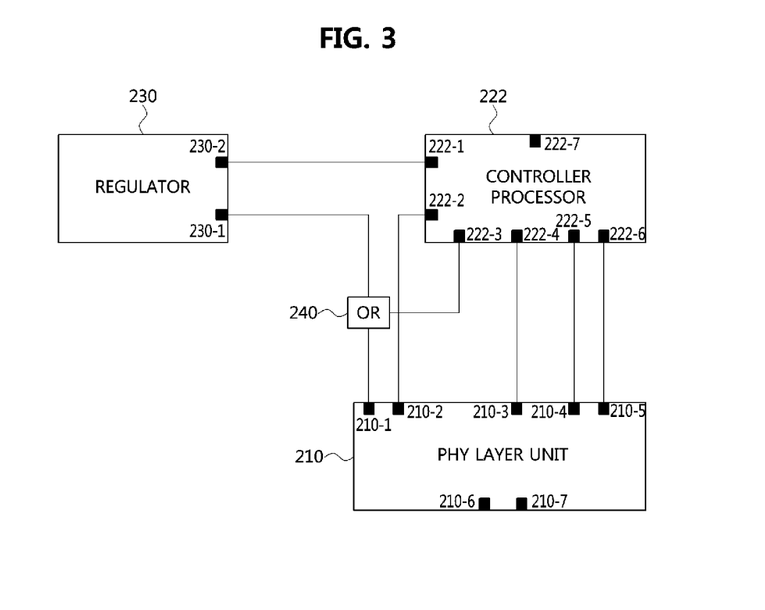
FIG. 3 is a block diagram showing relations of signal transmission and reception between entities included in a communication node shown in FIG. 2.

FIG. 3 is a block diagram showing relations of signal transmission and reception between entities included in a communication node shown in FIG. 2.

As shown FIG. 3, the PHY layer unit 210 (e.g., PHY layer processor 212) may include a plurality of pins. The PHY layer unit 210 may output a signal instructing supply of power, a signal instructing power off, and so on into a first pin 210-1. For example, a high signal to be outputted into the first pin 210-1 of the PHY layer unit 210 may instruct supply of power, and a low signal to be outputted into the first pin 210-1 of the PHY layer unit 210 may instruct power off. The first pin 210-1 of the PHY layer unit 210 may be an inhibition (INH) pin. The PHY layer unit 210 may output an interrupt signal according to a remote wakeup signal into a second pin 210-2. For example, a high signal to be outputted into the second pin 210-2 of the PHY layer unit 210 may instruct an interrupt. The second pin 210-2 of the PHY layer unit 210 may be an interrupt pin.

The PHY layer unit 210 may receive a signal instructing transition from the sleep mode to the normal mode, a signal instructing transition from the normal mode to the sleep mode, and so on through a third pin 210-3. For example, a high signal received through the third pin 210-3 of the PHY layer unit 210 may instruct transition from the sleep mode to the normal mode, and a low signal received through the third pin 210-3 of the PHY layer unit 210 may instruct transition from the normal mode to the sleep mode. The third pin 210-3 of the PHY layer unit 210 may be an enable (EN) pin.

A fourth pin 210-4 and a fifth pin 210-5 of the PHY layer unit 210 may be a management data input/output (MDIO) interface. For example, a signal may be received through the fourth pin 210-4 of the PHY layer unit 210, and a signal may be outputted into the fifth pin 210-5 of the PHY layer unit 210. The PHY layer unit 210 may output an Ethernet message into a sixth pin 210-6 and receive an Ethernet message through a seventh pint 210-7. Configuration of each of the plurality of pins included in the PHY layer unit 210 may be limited thereto, and each of the plurality of pins included in the PHY layer unit 210 may be configured in various ways.

The controller processor 222 may include a plurality of pins. The controller processor 222 may obtain power through a first pin 222-1. The controller processor 222 may receive the interrupt signal through a second pin 222-2. For example, the high signal received through the second pin 222-2 of the controller processor 222 may be the interrupt signal. When the interrupt signal is received, the controller processor 222 may change its operation mode. In this case, the operation mode of the controller processor 222 may be transitioned from the sleep mode to the normal mode. The second pin 222-2 of the controller processor 222 may be the interrupt pin. The controller processor 222 may output a signal instructing supply of power, a signal instructing power off, and so on into a third pin 222-3. For example, a high signal to be outputted into the third pin 222-3 of the controller processor 222 may instruct supply of power, and a low signal to be outputted into the third pin 222-3 of the controller processor 222 may instruct power off.

The controller processor 222 may output the signal instructing transition from the sleep mode to the normal mode, the signal instructing transition from the normal mode to the sleep mode, and so on into a fourth pin 222-4. For example, the high signal to be outputted into the fourth pin 222-4 of the controller processor 222 may instruct transition from the sleep mode to the normal mode, and the low signal to be outputted into the fourth pin 222-4 of the controller processor 222 may instruct transition from the normal mode to the sleep mode. The fourth pin 222-4 of the controller processor 222 may be the EN pin.

A fifth pin 222-5 and a sixth pin 222-6 of the controller processor 222 may be the MDIO interface. For example, the controller processor 222 may output a signal into the fifth pin 222-5 and receive a signal through the sixth pin 222-6. The controller processor 222 may receive a local wakeup signal through a seventh pin 222-7. For example, a high signal received through the seventh pin 222-7 of the controller processor 222 may be the local wakeup signal. The seventh pin 222-7 of the controller processor 222 may be a WAKE pin. Configuration of each of the plurality of pins included in the controller processor 222 may be limited thereto, and each of the plurality of pins included in the controller processor 222 may be configured in various ways.

The regulator 230 may receive a signal instructing supply of power, a signal instructing power off, and so on through a first pin 230-1. For example, a high signal received through the first pin 230-1 of the regulator 230 may instruct supply of power, and a low signal received through the first pin 230-1 of the regulator 230 may instruct power off. Based on the signal received through the first pin 230-1, the regulator 230 may supply power through a second pin 230-2. Configuration of each of the plurality of pins included in the regulator 230 may be limited thereto, and each of the plurality of pins included in the regulator 230 may be configured in various ways.

An OR circuit 240 may receive signals from the PHY layer unit 210 and the controller processor 222, and perform an OR calculation between the signal received from the PHY layer unit 210 and the signal received from the controller processor 222. The OR circuit 240 may output a result of the OR calculation. The result of the OR calculation may be transmitted to the first pin 230-1 of the regulator 230.

Next, a method for changing the operation mode of the PHY layer unit 210 (e.g., method of transition from the normal mode to the sleep mode) and a method for changing the operation mode of the controller processor 222 (e.g., method of transition from the normal mode to the sleep mode) will be described.

Figure 4:
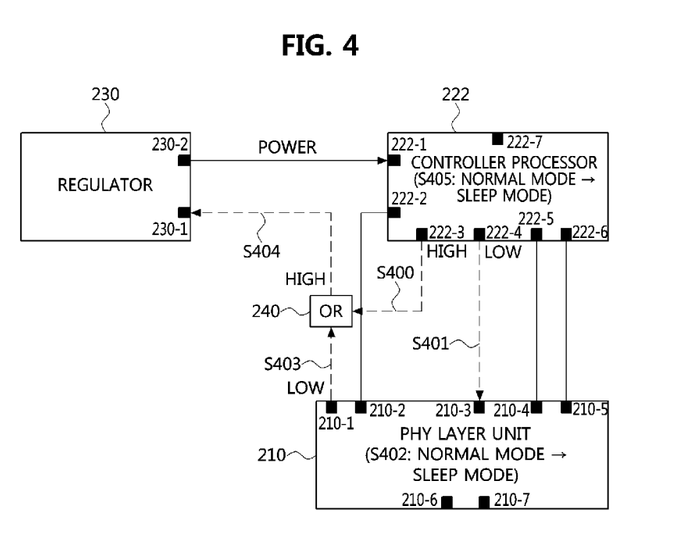
FIG. 4 is a block diagram showing a first operation method for a communication node according to embodiments of the present disclosure.

FIG. 4 is a block diagram showing a first operation method for a communication node according to embodiments of the present disclosure.

As shown FIG. 4, an initial operation mode of the PHY layer unit 210 may be the normal mode, and an initial operation mode of the controller processor 222 may be the normal mode. The regulator 230 may supply power to the controller processor 222 through the second pin 230-2. The controller processor 222 may output a signal (e.g., high signal) instructing supply of power into the third pin 222-3 (S400). The controller processor 222 may output a signal (e.g., low signal) instructing transition from the normal mode to the sleep mode into the fourth pin 222-4 (S401). Alternatively, the controller processor 222 may output the signal (e.g., high signal) instructing supply of power into the third pin 222-3 after outputting the signal (e.g., low signal) instructing transition from the normal mode to the sleep mode into the fourth pin 222-4.

The PHY layer unit 210 may receive the signal (e.g., low signal) instructing transition from the normal mode to the sleep mode through the third pin 210-3 and change its operation mode based on the received signal (S402). In this case, the operation mode of the PHY layer unit 210 may be transitioned from the normal mode to the sleep mode based on the received signal. After that, the PHY layer unit 210 may output a signal (e.g., low signal) instructing power off into the first pin 210-1 (S403). The OR circuit 240 may receive the signal (e.g., low signal) instructing power off from the PHY layer unit 210 and the signal (e.g., high signal) instructing supply of power from the controller processor 222. The OR circuit 240 may perform the OR calculation of the received signals (e.g., low signal, high signal) and output a result of the OR calculation (e.g., high signal) (S404). The result of the OR calculation may be a signal instructing supply of power.

The regulator 230 may receive the signal (e.g., high signal) instructing supply of power through the first pin 230-1. Here, the received signal may be the result of the OR calculation outputted from the OR circuit 240. Based on the received signal, the regulator 230 may supply power to the controller processor 222 through the second pin 230-2. Meanwhile, the controller processor 222 may change its operation mode (S405). In this case, the operation mode of the controller processor 222 may be transitioned from the normal mode to the sleep mode. That is, in a state in which power is consistently supplied to the controller processor 222, the controller processor 222 may operate in the sleep mode (e.g., power saving mode). Here, after signal output is completed through the third pin 222-3 and the fourth pin 222-4, the operation mode of the controller processor 222 may be transitioned from normal mode to the sleep mode. For example, the step S405 may be performed after completion of the steps S401 to S404.

Next, a local wakeup method of the PHY layer unit 210 (e.g., method of transition from the sleep mode to the normal mode) and a local wakeup method of the controller processor 222 (e.g., method of transition from the sleep mode to the normal mode) will be described.

Figure 5:
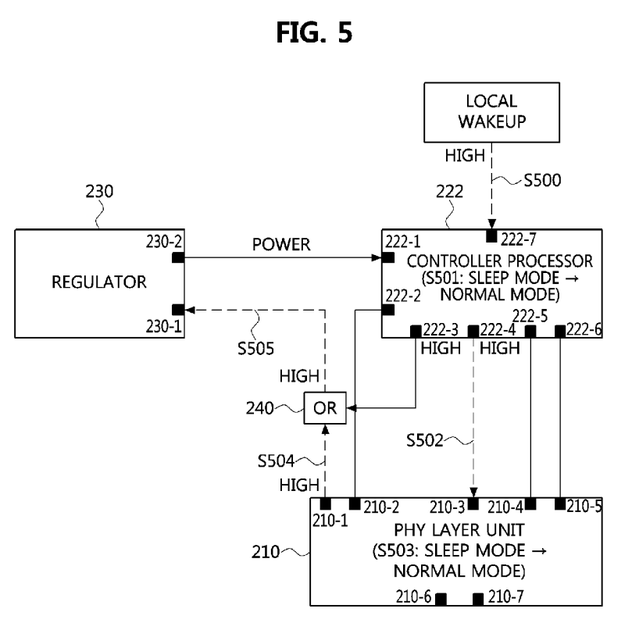
FIG. 5 is a block diagram showing a second operation method for a communication node according to embodiments of the present disclosure.

FIG. 5 is a block diagram showing a second operation method for a communication node according to embodiments of the present disclosure.

As shown FIG. 5, an initial operation mode of the PHY layer unit 210 may be the sleep mode, and an initial operation mode of the controller processor 222 may be the sleep mode. The regulator 230 may supply power to the controller processor 222 through the second pin 230-2. The controller processor 222 may receive a signal (e.g., high signal) instructing the local wakeup through the seventh pin 222-7 (S500). That is, the controller processor 222 may determine that the signal received from the seventh pin 222-7 is the signal instructing the local wakeup. When the signal instructing the local wakeup is received, the controller processor 222 may change its operation mode based on the signal instructing the local wakeup (S501). In this case, the operation mode of controller processor 222 may be transitioned from the sleep mode to the normal mode. After that, the controller processor 222 may output a signal (e.g., high signal) instructing transition from the sleep mode to the normal mode into the fourth pin 222-4 (S502). Also, the controller processor 222 may output a signal (e.g., high signal) instructing supply of power into the third pin 222-3.

The PHY layer unit 210 may receive the signal (e.g., high signal) instructing transition from the sleep mode to the normal mode through the third pin 210-3 and change its operation mode based on the received signal (S503). In this case, the operation mode of the PHY layer unit 210 may be transitioned from the sleep mode to the normal mode based on the received signal. After that, the PHY layer unit 210 may output a signal (e.g., high signal) instructing supply of power through the first pin 210-1 (S504).

The OR circuit 240 may receive the signal (e.g., high signal) instructing supply of power from the PHY layer unit 210 and the signal (e.g., high signal) instructing supply of power from the controller processor 222. The OR circuit 240 may perform the OR calculation of the received signals (e.g., high signal, high signal) and output a result of the OR calculation (e.g., high signal) (S505). The result of the OR calculation may be a signal instructing supply of power. The regulator 230 may receive the signal (e.g., high signal) instructing supply of power through the first pin 230-1. Here, the received signal may be the result of the OR calculation outputted from the OR circuit 240. Based on the received signal, the regulator 230 may supply power to the controller processor 222 through the second pin 230-2.

Next, a remote wakeup method of the PHY layer unit 210 (e.g., method of transition from the sleep mode to the normal mode) and a remote wakeup method of the controller processor 222 (e.g., method of transition from the sleep mode to the normal mode) will be described.

Figure 6:
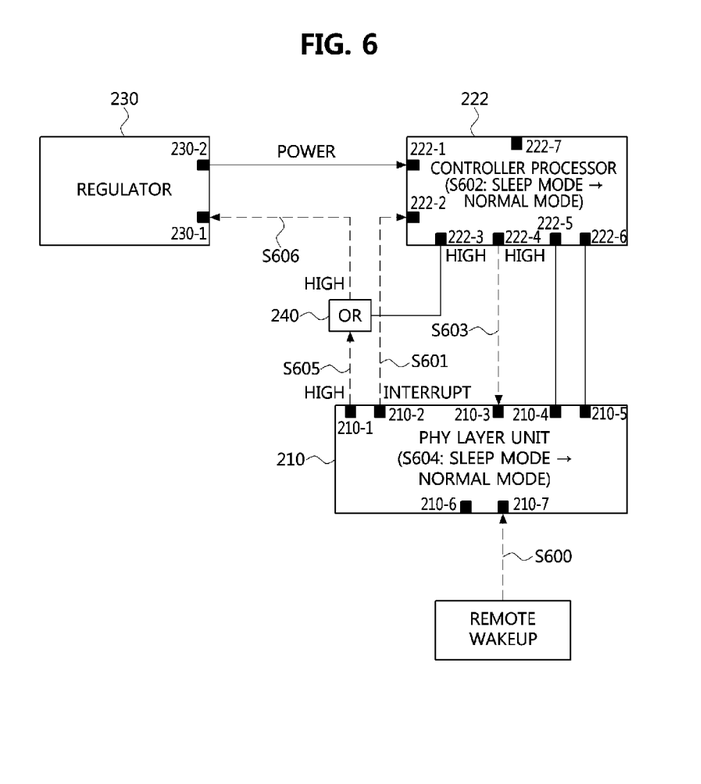
FIG. 6 is a block diagram showing a third operation method for a communication node according to embodiments of the present disclosure.

FIG. 6 is a block diagram showing a third operation method for a communication node according to embodiments of the present disclosure.

As shown FIG. 6, an initial operation mode of the PHY layer unit 210 may be the sleep mode, and an initial operation mode of the controller processor 222 may be the sleep mode. The regulator 230 may supply power to the controller processor 222 through the second pin 230-2. The PHY layer unit 210 may receive a signal (e.g., wakeup message) instructing the remote wakeup through the seventh pin 210-7 (S600). For example, the PHY layer unit 210 may detect the signal instructing the remote wakeup by performing an energy detection operation. Based on the signal instructing the remote wakeup, the PHY layer unit 210 may output an interrupt signal (e.g., high signal) into the second pin 210-2 (S601). The controller processor 222 may receive the interrupt signal through the second pin 222-2 and change its operation mode based on the received interrupt signal (S602). In this case, the operation mode of the controller processor 222 may be transitioned from the sleep mode to the normal mode. After that, the controller processor 222 may output a signal (e.g., high signal) instructing transition from the sleep mode to the normal mode into the fourth pin 222-4 (S603). Also, the controller processor 222 may output a signal (e.g., high signal) instructing supply of power into the third pin 222-3.

The PHY layer unit 210 may receive the signal (e.g., high signal) instructing transition from the sleep mode to the normal mode through the third pin 210-3. The PHY layer unit 210 may change its operation mode based on the received signal (S604). In this case, the operation mode of the PHY layer unit 210 may be transitioned from the sleep mode to the normal mode based on the received signal. After that, the PHY layer unit 210 may output a signal (e.g., high signal) instructing supply of power into the first pin 210-1 (S605).

The OR circuit 240 may receive the signal (e.g., high signal) instructing supply of power from the PHY layer unit 210 and the signal (e.g., high signal) instructing supply of power from the controller processor 222. The OR circuit 240 may perform the OR calculation of the received signals (e.g., high signal, high signal) and output a result of the OR calculation (e.g., high signal) (S606). The result of the OR calculation may be a signal instructing supply of power. The regulator 230 may receive the signal (e.g., high signal) instructing supply of power through the first pin 230-1.

Here, the received signal may be the result of the OR calculation outputted from the OR circuit 240. Based on the received signal, the regulator 230 may supply power to the controller processor 222 through the second pin 230-2.

Next, a method for changing the operation mode of the PHY layer unit 210 (e.g., method of transition from the normal mode to the sleep mode) and a method for changing the operation mode of the controller processor 222 (e.g., method of transition from the normal mode to the power off mode) will be described.

Figure 7:
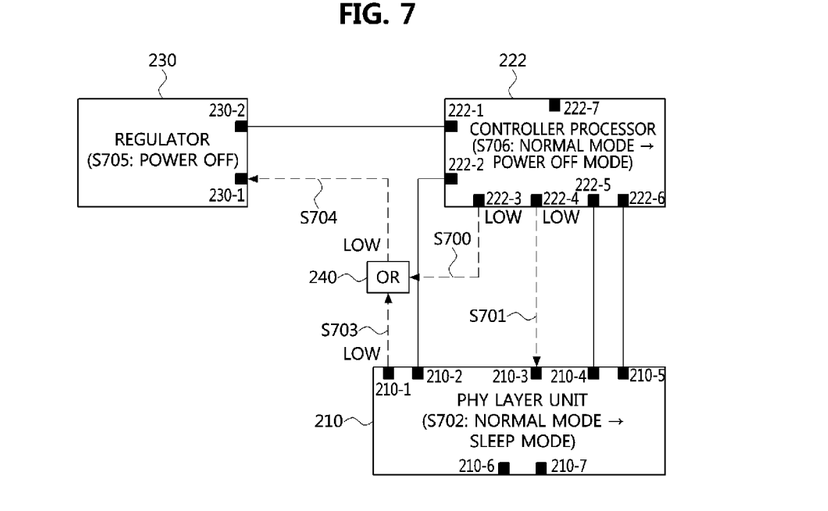
FIG. 7 is a block diagram showing a fourth operation method for a communication node according to embodiments of the present disclosure.

FIG. 7 is a block diagram showing a fourth operation method for a communication node according to embodiments of the present disclosure.

As shown FIG. 7, an initial operation mode of the PHY layer unit 210 may be the normal mode, and an initial operation mode of the controller processor 222 may be the normal mode. The regulator 230 may supply power to the controller processor 222 through the second pin 230-2. The controller processor 222 may output a signal (e.g., low signal) instructing power off into the third pin 222-3 (S700). After that, the controller processor 222 may output a signal (e.g., low signal) instructing transition from the normal mode to the sleep mode into the fourth pin 222-4 (S701).

The PHY layer unit 210 may receive the signal (e.g., low signal) instructing transition from the normal mode to the sleep mode through the third pin 210-3 and change its operation mode based on the received signal (S702). In this case, the operation mode of the PHY layer unit 210 may be transitioned from the normal mode to the sleep mode based on the received signal. After that, the PHY layer unit 210 may output a signal (e.g., low signal) instructing power off into the first pin 210-1 (S703).

The OR circuit 240 may receive the signal (e.g., low signal) instructing power off from the PHY layer unit 210 and the signal (e.g., low signal) instructing power off from the controller processor 222. The OR circuit 240 may perform the OR calculation of the received signals (e.g., low signal, low signal) and output a result of the OR calculation (e.g., low signal) (S704). The result of the OR calculation may be a signal instructing power off. The regulator 230 may receive the signal (e.g., low signal) instructing power off through the first pin 230-1. Here, the received signal may be the result of the OR calculation outputted from the OR circuit 240. Based on the received signal, the regulator 230 may stop supply of power to the controller processor 222 through the second pin 230-2 (S705). Therefore, the controller processor 222 may not obtain power through the first pin 222-1. In this case, the operation mode of the controller processor 222 may be transitioned from the normal mode to the power off mode (S706).

Next, other method for changing the operation mode of the PHY layer unit 210 (e.g., method of transition from the normal mode to the sleep mode) and other method for changing the operation mode of the controller processor 222 (e.g., method of transition from the normal mode to the power off mode) will be described.

Figure 8:
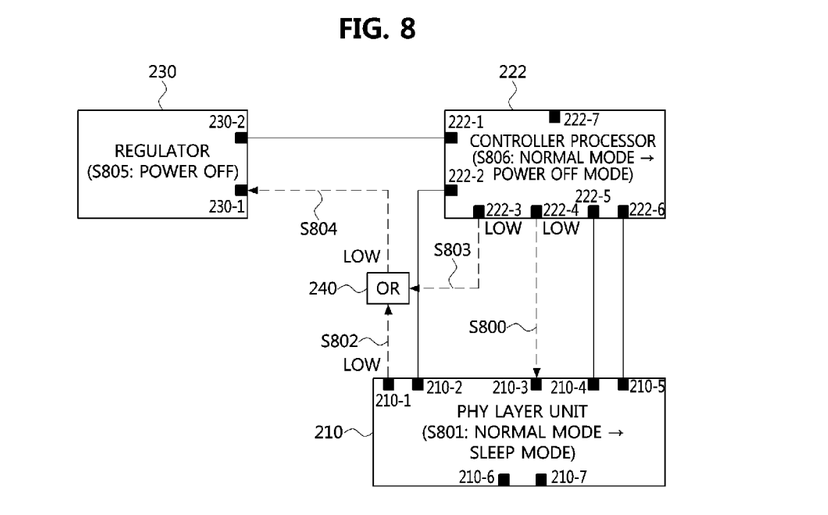
FIG. 8 is a block diagram showing a fifth operation method for a communication node according to embodiments of the present disclosure.

FIG. 8 is a block diagram showing a fifth operation method for a communication node according to embodiments of the present disclosure.

As shown FIG. 8, differences between the operation method of the communication node shown in FIG. 8 and the operation method of the communication node shown in FIG. 7 are output sequence between a signal instructing transition from the normal mode to the sleep mode and a signal instructing power off. In the operation method of the communication node shown in FIG. 8, the controller processor 222 may output the signal instructing power off after outputting the signal instructing transition from the normal mode to the sleep mode. On the other hand, in the operation method of the communication node shown in FIG. 7, the controller processor 222 may output the signal instructing transition from the normal mode to the sleep mode after outputting the signal instructing power off.

An initial operation mode of the PHY layer unit 210 may be the normal mode, and an initial operation mode of the controller processor 222 may be the normal mode. The regulator 230 may supply power to the controller processor 222 through the second pin 230-2. The controller processor 222 may output the signal (e.g., low signal) instructing transition from the normal mode to the sleep mode into the fourth pin 222-4 (S800).

The PHY layer unit 210 may receive the signal (e.g., low signal) instructing transition from the normal mode to the sleep mode through the third pin 210-3 and change its operation mode based on the received signal (S801). In this case, the operation mode of the PHY layer unit 210 may be transitioned from the normal mode to the sleep mode based on the received signal. After that, the PHY layer unit 210 may output a signal (e.g., low signal) instructing power off into the first pin 210-1 (S802). The controller processor 222 may output the signal (e.g., low signal) instructing power off into the third pin 222-3 (S803). Here, it is described that the step S803 is performed after the step S802. However, performing sequence of the step S803 is not limited thereto. For example, the step S803 may be performed prior to the step S801 (e.g., between the step S800 and the step S801) or after the step S801 (e.g., between the step S801 and the step S802).

The OR circuit 240 may receive the signal (e.g., low signal) instructing power off from the PHY layer unit 210 and the signal (e.g., low signal) instructing power off from the controller processor 222. The OR circuit 240 may perform the OR calculation of the received signals (e.g., low signal, low signal) and output a result of the OR calculation (e.g., low signal) (S804). The result of the OR calculation may be a signal instructing power off. The regulator 230 may receive the signal (e.g., low signal) instructing power off through the first pin 230-1. Here, the received signal may be the result of the OR calculation outputted from the OR circuit 240. Based on the received signal, the regulator 230 may stop supply of power to the controller processor 222 through the second pin 230-2 (S805). Therefore, the controller processor 222 may not obtain power through the first pin 222-1. In this case, the operation mode of the controller processor 222 may be transitioned from the normal mode to the power off mode (S806).

Next, a remote wakeup method of the PHY layer unit 210 (e.g., method of transition from the sleep mode to the normal mode) and a remote wakeup method of the controller processor 222 (e.g., method of transition from the power off mode to the normal mode) will be described.

Figure 9:
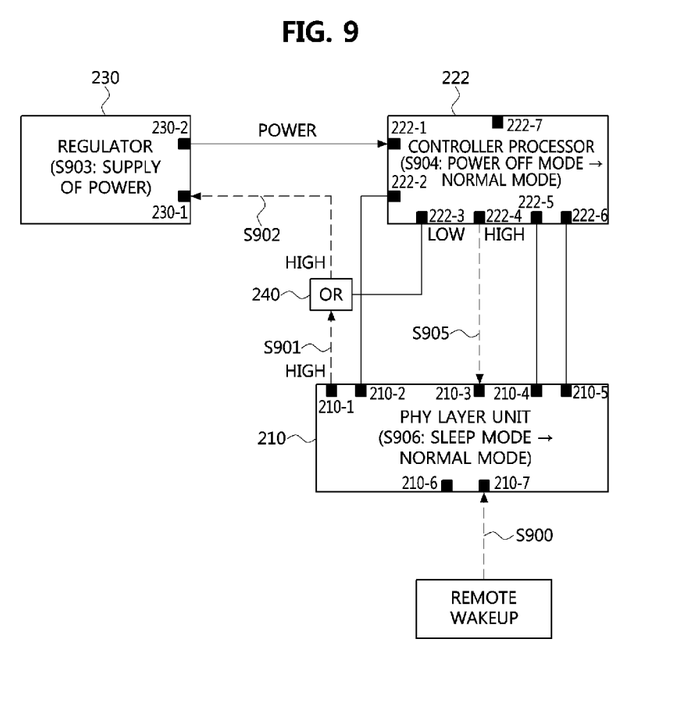
FIG. 9 is a block diagram showing a sixth operation method for a communication node according to embodiments of the present disclosure.

FIG. 9 is a block diagram showing a sixth operation method for a communication node according to embodiments of the present disclosure.

As shown FIG. 9, an initial operation mode of the PHY layer unit 210 may be the sleep mode, and an initial operation mode of the controller processor 222 may be the power off mode. Here, the regulator 230 may not supply power to the controller processor 222 through the second pin 230-2. The PHY layer unit 210 may receive a signal (e.g., wakeup message) instructing the remote wakeup through the seventh pin 210-7 (S900). For example, the PHY layer unit 210 may detect the signal instructing the remote wakeup by performing the energy detection operation. Based on the signal instructing the remote wakeup, the PHY layer unit 210 may output a signal (e.g., high signal) instructing supply of power into the first pin 210-1 (S901).

The OR circuit 240 may receive the signal (e.g., high signal) instructing supply of power from the PHY layer unit 210 and the signal (e.g., low signal) instructing power off from the controller processor 222. The OR circuit 240 may perform the OR calculation of the received signals (e.g., high signal, low signal) and output a result of the OR calculation (e.g., high signal) (S902). The result of the OR calculation may be a signal instructing supply of power. The regulator 230 may receive the signal (e.g., high signal) instructing supply of power through the first pin 230-1. Here, the received signal may be the result of the OR calculation outputted from the OR circuit 240. Based on the received signal, the regulator 230 may supply power to the controller processor 222 through the second pin 230-2 (S903).

The controller processor 222 may obtain power through the first pin 222-1 and change its operation mode (S904). In this case, the operation mode of the controller processor 222 may be transitioned from the power off mode to the normal mode. After that, the controller processor 222 may output a signal (e.g., high signal) instructing transition from the sleep mode to the normal mode into the fourth pin 222-4 (S905). The PHY layer unit 210 may receive the signal (e.g., high signal) instructing transition from the sleep mode to the normal mode through the third pin 210-3. The PHY layer unit 210 may change its operation mode based on the received signal (S906). In this case, the operation mode of the PHY layer unit 210 may be transitioned from the sleep mode to the normal mode based on the received signal.

The methods described herein according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure. Thus, the embodiments disclosed herein are intended to cover various modifications and equivalent arrangements included within the spirit and scope of the appended claims.

What is claimed is:

1. An operation method of a communication node in an Ethernet-based vehicle network, wherein the communication node includes a regulator, a physical (PHY) layer unit, and a processor, the method comprising:
    outputting, by the processor, a first signal instructing power off;
    after outputting the first signal instructing power off, outputting, by the processor, a second signal instructing transition from a normal mode to a sleep mode;
    transitioning, by the PHY layer unit, from the normal mode to the sleep mode when the second signal is received at the PHY layer unit from the processor;
    outputting, by the PHY layer unit, a third signal instructing power off;
    stopping, by the regulator, a supply of power to the processor according to a result of an OR calculation of the first signal and the third signal; and
    transitioning, by the processor, from the normal mode to a power off mode when the power is not supplied.

2. The method according to claim 1, wherein the normal mode indicates a wakeup state, the sleep mode indicates a power saving state, and the power off mode indicates a state in which the power is not supplied.

3. An operation method of a communication node in an Ethernet-based vehicle network, wherein the communication node includes a regulator, a physical (PHY) layer unit, and a processor, the method comprising:
    outputting, by the processor, a first signal instructing transition from a normal mode to a sleep mode;
    transitioning, by the PHY layer unit, from the normal mode to the sleep mode when the first signal is received at the PHY layer unit from the processor;
    outputting, by the PHY layer unit, a second signal instructing power off;
    after outputting the first signal instructing transition from the normal mode to the sleep mode, outputting, by the processor, a third signal instructing power off;
    stopping, by the regulator, a supply of power to the processor according to a result of an OR calculation of the second signal and the third signal; and
    transitioning, by the processor, from the normal mode to a power off mode when the power is not supplied.

4. An operation method of a communication node in an Ethernet-based vehicle network, wherein the communication node includes a regulator, a physical (PHY) layer unit, and a processor, the method comprising:
    outputting, by the PHY layer unit, a first signal instructing supply of power according to a remote wakeup signal;
    supplying, by the regulator, power to the processor according to a result of an OR calculation of the first signal and a second signal instructing power off;
    transitioning, by the processor, from a power off mode to a normal mode according to the supplied power;
    outputting, by the processor, a third signal instructing transition from a sleep mode to the normal mode; and
    transitioning, by the PHY layer unit, from the sleep mode to the normal mode when the third signal is received at the PHY layer unit from the processor.

5. The method according to claim 4, wherein the normal mode indicates a wakeup state, the sleep mode indicates a power saving state, and the power off mode indicates a state in which the power is not supplied.

6. A communication node in an Ethernet-based vehicle network, the communication node comprising:
    a processor;
    a physical (PHY) layer unit connected to the processor;
    a regulator supplying power to the processor;
    a memory storing one or more commands executed by the processor, the PHY layer unit, and the regulator,
    wherein the one or more commands are executed to output, by the processor, a first signal instructing power off; after outputting the first signal instructing power off, output, by the processor, a second signal instructing transition from a normal mode to a sleep mode; transition, by the PHY layer unit, from the normal mode to the sleep mode when the second signal is received at the PHY layer unit from the processor; output, by the PHY layer unit, a third signal instructing power off; stop, by the regulator, a supply of power to the processor according to a result of an OR calculation of the first signal and the third signal; and transition, by the processor, from the normal mode to a power off mode when the power is not supplied.

7. The communication node according to claim 6, wherein the normal mode indicates a wakeup state, the sleep mode indicates a power saving state, and the power off mode indicates a state in which the power is not supplied.

8. A communication node in an Ethernet-based vehicle network, the communication node comprising:

a processor;

a physical (PHY) layer unit connected to the processor;

a regulator supplying power to the processor;

a memory storing one or more commands executed by the processor, the PHY layer unit, and the regulator, wherein the one or more commands are executed to output, by the processor, a first signal instructing transition from a normal mode to a sleep mode; transition, by the PHY layer unit, from the normal mode to the sleep mode when the first signal is received at the PHY layer unit from the processor; after outputting the first signal instructing transition from the normal mode to the sleep mode, output, by the PHY layer unit, a second signal instructing power off; output, by the processor, a third signal instructing power off; stop, by the regulator, a supply of power to the processor according to a result of an OR calculation of the second signal and the third signal; and transition, by the processor, from the normal mode to a power off mode when the power is not supplied.

9. A communication node in an Ethernet-based vehicle network, the communication node comprising:

a processor;

a physical (PHY) layer unit connected to the processor;

a regulator supplying power to the processor;

a memory storing one or more commands executed by the processor, the PHY layer unit, and the regulator, wherein the one or more commands are executed to output, by the PHY layer unit, a first signal instructing supply of power according to a remote wakeup signal; supply, by the regulator, power to the processor according to a result of an OR calculation of the first signal and a second signal instructing power off; transition, by the processor, from a power off mode to a normal mode according to the supplied power; output, by the processor, a third signal instructing transition from a sleep mode to the normal mode; and transition, by the PHY layer unit, from the sleep mode to the normal mode when the third signal is received at the PHY layer unit from the processor.

10. The communication node according to claim 9, wherein the normal mode indicates a wakeup state, the sleep mode indicates a power saving state, and the power off mode indicates a state in which the power is not supplied.

* * * * *